C. SIMANIK.
RANGE FINDER.
APPLICATION FILED APR. 13, 1917.

1,288,713.

Patented Dec. 24, 1918.
2 SHEETS—SHEET 1.

WITNESSES

INVENTOR
C. SIMANIK

BY

ATT'YS.

C. SIMANIK.
RANGE FINDER.
APPLICATION FILED APR. 13, 1917.

1,288,713.

Patented Dec. 24, 1918.
2 SHEETS—SHEET 2.

UNITED STATES PATENT OFFICE.

CHARLES SIMANIK, OF CALDER STATION, SASKATCHEWAN, CANADA.

RANGE-FINDER.

1,288,713.  Specification of Letters Patent.  Patented Dec. 24, 1918.

Application filed April 13, 1917. Serial No. 161,827.

*To all whom it may concern:*

Be it known that I, CHARLES SIMANIK, residing at Calder Station, in the Province of Saskatchewan, Dominion of Canada, have invented certain new and useful Improvements in Range-Finders, of which the following is a specification.

This invention relates to improvements in range finders, and the objects of the invention are to facilitate the determining of the range of a distant object, to render the device compact in construction thereby occupying a minimum space and capable of ready transportation, to permit of the ready assembly and setting up of the range finder, and generally to adapt the several parts to better perform the functions required of them.

With the above and other objects in view the invention consists essentially of the improved construction particularly described and set forth in the following specification and accompanying drawings forming part of the same.

In the drawings.

Like characters of reference refer to like parts in the several figures.

Figure 1:
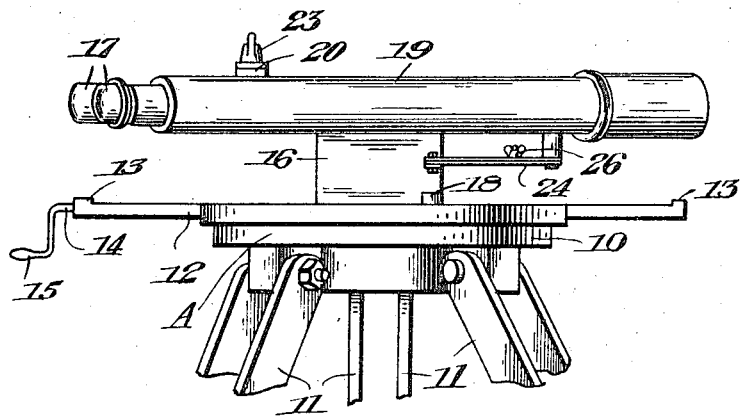
Figure 1 is a side elevation of the improved range finder.
Figure 2:
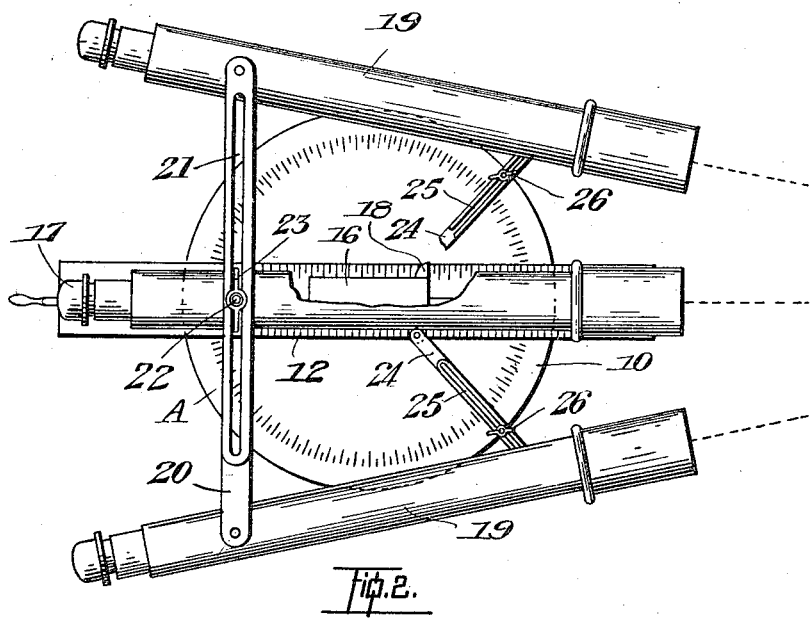
Fig. 2 is a plan view of the same.
Figure 3:
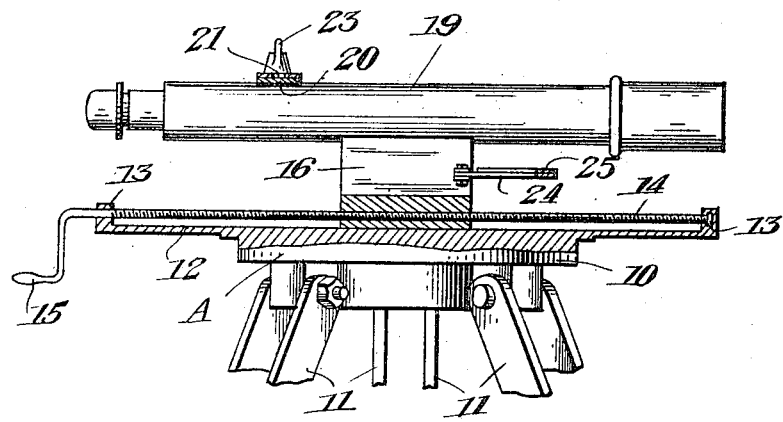
Fig. 3 is a side elevation partly sectional of the improved range finder.
Figure 4:
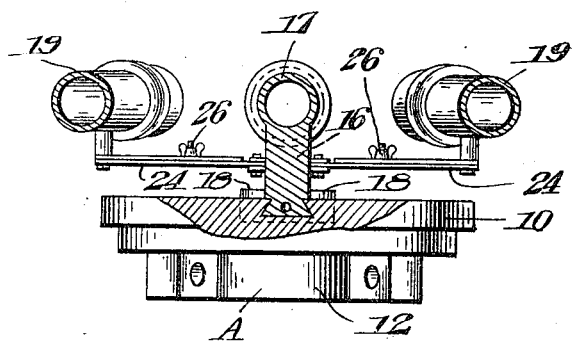
Fig. 4 is a front elevation partly sectional of the improved range finder.

Referring to the drawings, A represents the improved range finder comprising the compass 10 operatively supported on the legs 11. The said compass being of any usual construction well known in the art, it is deemed unnecessary to further describe the same.

Located above the compass 10 is a scale 12 subdivided to represent miles, yards or like distances and provided with up-turned ends 13 rotatably supporting the screw 14, which extends diametrically across the compass 10, the said screw being provided with a crank handle 15, thereby facilitating in manually rotating the same.

The screw makes threaded engagement with a block 16 slidably mounted above the compass 10 and operatively supports a telescope 17, the said block being further provided with a pair of pointers 18, designed to register with the graduations on the scale 12.

A pair of angularly disposed telescopes 19 are arranged one on each side of the telescope 17, and designed to lie in the same horizontal plane therewith, the front end of the telescopes 19 being operatively supported from the central telescope 17, by the adjustable links 20, the outer ends of which are pivotally connected to the telescope 19.

These links are provided with longitudinally extending slots 21 adapted to engage with the set screw 22, carried by the telescope 17, so that when the links have been adjusted they are held in the desired position by the wing nut 23, making threaded engagement with the said set screw.

The front of the telescopes 19 are operatively connected to the block 16 by the coacting adjustable links 24, the outer ends of which are pivotally mounted to the said telescopes and block respectively, and are provided with longitudinally extending slots 25, with which the bolt 26 adjustably engages.

The assembly of the range finder will be readily understood from the foregoing description.

When the range finder is in use, the operator focuses the telescope 17 on an object, whereupon the crank handle 15 is rotated until, on the operator looking through one of the telescopes 19, the object is brought into the field, and in this position it will be understood the lines of vision through the telescopes 17 and 19 will intersect on the said object, and the range can then be read on the scale 12, as indicated by the pointers 18.

Should the object of which it is desired to obtain the range be a distant one, the links 20 and 24 are adjusted to displace the telescopes 19 laterally relatively to the telescope 17, and this adjustment provides for the use of a larger base line, so that the intersection of the lines of vision, through the telescopes will always be distinct.

By using a pair of telescopes 19, a reading obtained by one of the said telescopes and the telescope 17 can always be verified by the remaining telescope.

From this description, it will be seen that I have invented a range finder which can be advantageously employed by soldiers, surveyors, engineers and the like, in which the several parts can be assembled and set up with a minimum of time and labor.

As many changes could be made in the above construction, and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. A range finder comprising a telescope, an angularly disposed telescope, arranged at the side of the said telescope and designed to lie on the same plane therewith, a graduated scale, and a pointer carried by the first telescope coacting with the scale.

2. A range finder comprising a telescope, a block operatively supporting the telescope and provided with pointer, a telescope arranged at the side of the said telescope, adjustable links operatively connecting the last named telescope to the block and a scale coacting with the pointer carried by the block.

In witness whereof I have hereunto set my hand in the presence of two witnesses.

CHARLES SIMANIK.

Witnesses:
ALEK SIMANIK,
OLIVE AINSWORTH.

Copies of this patent may be obtained for five cents each, by addressing the "Commissioner of Patents, Washington, D. C."